United States Patent
Koeda et al.

(10) Patent No.: US 10,328,876 B2
(45) Date of Patent: Jun. 25, 2019

(54) ELECTRICAL CABLE SYSTEM FOR A VEHICLE

(71) Applicant: Continental Teves AG & Co. oHG, Frankfurt (DE)

(72) Inventors: Akihiro Koeda, Yokohama (JP); Isao Ohno, Itabashi-ku (JP); Alejandro Gonzalez, Kanagawa-pref (JP); Hideki Sakai, Yokohama (JP)

(73) Assignee: Continental Teves AG & Co. oHG, Frankfurt am Main (DE)

( * ) Notice: Subject to any disclaimer, the term of this patent is extended or adjusted under 35 U.S.C. 154(b) by 0 days.

(21) Appl. No.: 16/091,608

(22) PCT Filed: Apr. 18, 2016

(86) PCT No.: PCT/EP2016/058533
§ 371 (c)(1),
(2) Date: Oct. 5, 2018

(87) PCT Pub. No.: WO2017/182048
PCT Pub. Date: Oct. 26, 2017

(65) Prior Publication Data
US 2019/0161030 A1    May 30, 2019

(51) Int. Cl.
*B60R 16/023* (2006.01)
*H01B 7/02* (2006.01)
(Continued)

(52) U.S. Cl.
CPC ......... *B60R 16/023* (2013.01); *H01B 7/0225* (2013.01); *H01B 7/1885* (2013.01); *H02G 3/0456* (2013.01)

(58) Field of Classification Search
CPC .. B60R 16/023; H01B 7/1885; H01B 7/0225; H02G 3/0456
(Continued)

(56) References Cited

U.S. PATENT DOCUMENTS 2,732,422 A    1/1956 Rapp
9,799,424 B2   10/2017 Heipel et al.
(Continued)

FOREIGN PATENT DOCUMENTS

WO    2015090658 A1    6/2015

OTHER PUBLICATIONS

International Search Report and Written Opinion for International Application No. PCT/EP2016/058533, dated Jan. 20, 2017—8 pages.

*Primary Examiner* — Sherman Ng
(74) *Attorney, Agent, or Firm* — RatnerPrestia

(57) ABSTRACT

An electrical line system for a vehicle, includes a first line arrangement for electrically connecting a first vehicle system to a first controller, a second line arrangement for electrically connecting a second vehicle system to a second controller, and an external sheath which surrounds the first line arrangement and the second line arrangement at least in sections, wherein an isolating medium is arranged within the external sheath, wherein the isolating medium is designed to surround the first line arrangement and the second line arrangement and to keep the line arrangements at a distance from the external sheath in order to reduce a pull-off force when pulling off the external sheath.

16 Claims, 2 Drawing Sheets

(51) Int. Cl.
*H02G 3/04* (2006.01)
*H01B 7/18* (2006.01)

(58) Field of Classification Search
USPC .............................................. 174/72 A, 74 R
See application file for complete search history.

(56) References Cited

U.S. PATENT DOCUMENTS

| | | | |
|---|---|---|---|
| 2005/0225165 A1* | 10/2005 | Naik | B60T 8/321 |
| | | | 303/20 |
| 2013/0277087 A1 | 10/2013 | Hayakawa et al. | |
| 2014/0326480 A1 | 11/2014 | Hashimoto et al. | |
| 2016/0176369 A1* | 6/2016 | Ito | B60R 16/023 |
| | | | 174/72 A |
| 2017/0263353 A1* | 9/2017 | Hayakawa | B60T 7/107 |
| 2017/0264063 A1* | 9/2017 | Hayakawa | H01R 31/005 |

* cited by examiner

ELECTRICAL CABLE SYSTEM FOR A VEHICLE

CROSS REFERENCE TO RELATED APPLICATION

This application is the U.S. National Phase Application of PCT International Application No. PCT/EP2016/058533, filed Apr. 18, 2016, the contents of such application being incorporated by reference herein.

FIELD OF THE INVENTION

The present invention relates to an electrical line system for electrically connecting vehicle systems to vehicle controllers.

BACKGROUND OF THE INVENTION

Modern vehicles often have a large number of vehicle systems which, in turn, comprise a large number of sensors and actuators which are electrically connected to controllers of the vehicle via electrical lines.

Antilock brake systems (ABS) comprise, for example, wheel rotation-speed sensors which detect wheel rotation-speed information and transmit said wheel rotation-speed information to an associated controller (ECU, electronic control unit) of the vehicle. The controller can optimize braking performance of the vehicle based on the wheel rotation-speed information.

Active wheel suspension systems allow the driver to adjust the suspension of a vehicle, for example in order to increase driving comfort or to adapt the vehicle to different environmental conditions. To this end, control and sensor information is exchanged between the wheel suspension system and an associated vehicle controller.

For the signal interchange between the vehicle systems and the controllers that is required for this purpose, a large number of electrical lines usually have to be individually laid in the vehicle. This can lead to a considerable amount of work on account of the large number of vehicle systems. Furthermore, the individually laid electrical lines often take up a considerable amount of installation space in the vehicle.

SUMMARY OF THE INVENTION

An aspect of the present invention is an efficient concept for an electrical line system for a vehicle which takes up a small amount of installation space and can be mounted in the vehicle with a low level of expenditure.

According to a first aspect, the invention relates to an electrical line system for a vehicle, comprising a first line arrangement for electrically connecting a first vehicle system to a first controller, a second line arrangement for electrically connecting a second vehicle system to a second controller, and an external sheath which surrounds the first line arrangement and the second line arrangement at least in sections, wherein an isolating medium is arranged within the external sheath, wherein the isolating medium is designed to surround the first line arrangement and the second line arrangement and to keep said line arrangements at a distance from the external sheath in order to reduce a pull-off force when pulling off the external sheath. This achieves the advantage that a line system which can be laid in the vehicle in an efficient and space-saving manner is created. The line system can comprise a large number of electrical lines which are sheathed by the common external sheath. Therefore, lines which connect different vehicle systems to different controllers can be jointly laid, as a result of which a mounting time for the lines can be considerably reduced.

The first vehicle system and the second vehicle system can comprise sensors and/or actuators of the vehicle. By way of example, the first vehicle system is a wheel rotation-speed sensor which is mounted on a vehicle axle, and the second vehicle system is an active wheel suspension. The wheel rotation-speed sensor and the active wheel suspension can be connected to controllers of the vehicle via the first and, respectively, second line arrangement.

The first controller and the second controller can be part of a safety system of the vehicle such as an antilock brake system (ABS) or an electronic stability control system (ESP). The first controller and the second controller can receive signals, for example sensor signals or control signals, from or transmit said signals to the first vehicle system and, respectively, the second vehicle system via the first line arrangement and, respectively, the second line arrangement.

The external sheath can sheath the line arrangements only in sections, so that isolation of the line arrangements for connection to different vehicle systems or controllers is made possible. During mounting of the line system, the external sheath can initially surround the line arrangements over the entire length. Depending on the position of and distance between the vehicle systems and controllers, the external sheath can then be correspondingly shortened at both ends of the line system in order to lay the individual line arrangements to the corresponding vehicle systems and controllers. Shortening of the external sheath can be made considerably easier by the isolating medium within the external sheath. For example, sections of the external sheath of different length can be isolated from the rest of the sheath and pulled off from the line system without a considerable application of force. In particular, a frictional resistance between the external sheath and the line arrangements can be avoided on account of the isolating medium, and therefore the required pull-off force for pulling off the external sheath can be considerably reduced.

According to one embodiment, the isolating medium comprises a nonwoven fabric, in particular a nonwoven fabric composed of an electrically insulating material, wherein the nonwoven fabric is designed to fill cavities within the external sheath, in particular between the line arrangements and the external sheath. This achieves the advantage that the pull-off force when pulling-off the external sheath can be reduced. The external sheath is kept at a distance from the line arrangements by the isolating medium, so that a frictional resistance between the external sheath and the cables of the line arrangements can be efficiently reduced.

According to one embodiment, the isolating medium comprises an isolating sheath which surrounds the first line arrangement and the second line arrangement. This achieves the advantage that the line arrangements can be kept at a distance from the external sheath in an efficient manner.

According to one embodiment, the isolating medium, in particular the isolating sheath, has a first cutout for receiving the first line arrangement and a second cutout for receiving the second line arrangement.

According to one embodiment, the external sheath is formed from a plastic, in particular from a thermoplastic elastomer. This achieves the advantage that the external sheath can have a high mechanical flexibility for laying in the vehicle and at the same time a high mechanical stability in order to protect the sheathed line arrangements against damage.

According to one embodiment, the first line arrangement and the second line arrangement each comprise a first electrical line, in particular a signal cable, and a second electrical line, in particular a ground cable. This achieves the advantage that signal transmission between the vehicle systems and controllers can be performed in an efficient manner by means of the line arrangements.

According to one embodiment, the first line arrangement comprises a first internal sheath, wherein the first internal sheath surrounds the electrical lines of the first line arrangement, and/or wherein the second line arrangement comprises a second internal sheath, wherein the second internal sheath surrounds the electrical lines of the second line arrangement.

According to one embodiment, the first lines and the second lines each have a copper core which is sheathed by an insulator sheath.

According to one embodiment, the first line arrangement and the second line arrangement each have a plug-in connector at both ends in order to connect the line arrangements to the corresponding vehicle systems and controllers. This achieves the advantage that the line arrangements can be connected to the controllers and vehicle systems in an efficient manner.

According to one embodiment, the external sheath has a number of mounting lugs for mounting the electrical line system on the vehicle. This achieves the advantage that the electrical line system can be mounted on the vehicle in an efficient manner.

According to one embodiment, the mounting lugs can be mounted on a number of mounting clips, wherein the mounting clips are arranged on the vehicle, in particular on a body of the vehicle. This achieves the advantage that the electrical line system can be mounted on the vehicle in an efficient manner.

According to one embodiment, the external sheath has a number of clips, in particular cable ties, for mounting the electrical line system on the vehicle. This achieves the advantage that the electrical line system can be mounted on the vehicle in an efficient manner. The clips can be used in order to fasten the electrical line system to projections or mounting brackets on the vehicle body.

According to one embodiment, the first vehicle system comprises a wheel rotation-speed sensor, wherein the first line arrangement is designed to transmit a sensor signal of the wheel rotation-speed sensor to the first controller, and/or wherein the second vehicle system comprises an active wheel suspension, wherein the second line arrangement is designed to transmit a signal of the wheel suspension to the second controller.

BRIEF DESCRIPTION OF THE DRAWINGS

Further exemplary embodiments are explained in more detail with reference to the appended figures, in which.

DETAILED DESCRIPTION OF THE PREFERRED EMBODIMENTS

In the following detailed description, reference is made to the accompanying drawings, which form a part thereof and which show, as an illustration, specific embodiments in which aspects of the invention can be carried out. It goes without saying that other embodiments can also be used and structural or logical changes can be made without departing from the concept of the present invention. The following detailed description should therefore not be understood in a restrictive sense. It also goes without saying that the features of the various exemplary embodiments described herein can be combined with one another unless specifically stated otherwise.

The aspects and embodiments are described with reference to the drawings, wherein identical reference signs generally relate to identical elements. Numerous specific details are stated in the following description for the purposes of explanation in order to provide an in-depth understanding of one or more aspects of the invention. However, it may be obvious to a person skilled in the art that one or more aspects or embodiments can be implemented with a lower degree of the specific details. In other cases, known structures and elements are illustrated in a schematic form in order to facilitate the description of one or more aspects or embodiments. It goes without saying that other embodiments can be used and structural or logical changes can be made without departing from the concept of the present invention.

Even though a particular feature or a particular aspect of an embodiment may have been disclosed with respect to only one of a plurality of implementations, such a feature or such an aspect can also be combined with one or more other features or aspects of the other implementations, as may be desirable and advantageous for a given or particular application. Furthermore, to the extent to which the expressions "contain", "have", "having" or other variants thereof are used either in the detailed description or in the claims, such expressions are intended to be inclusive in a manner similar to the expression "comprise". The expressions "coupled" and "connected" may have been used together with derivatives thereof. It goes without saying that such expressions are used to state that two elements cooperate or interact with one another irrespective of whether they are in direct physical or electrical contact or are not in direct contact with one another. In addition, the expression "by way of example" should be interpreted only as an example instead of denoting the best or optimum case. The following description should therefore not be understood in a restrictive sense.

Figure 1:
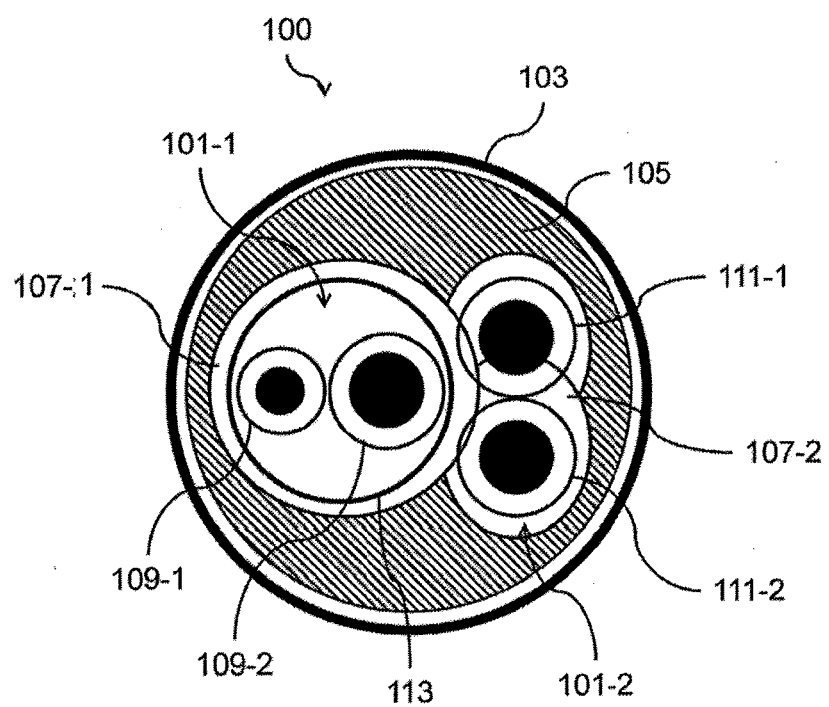
FIG. 1 shows a schematic cross-sectional view of an electrical line system.

FIG. 1 shows a schematic cross-sectional view of an electrical line system 100 for a vehicle according to one embodiment.

The electrical line system 100 comprises a first line arrangement 101-1 for electrically connecting a first vehicle system to a first controller, a second line arrangement 101-2 for electrically connecting a second vehicle system to a second controller, and an external sheath 103 which surrounds the first line arrangement 101-1 and the second line arrangement 101-2 at least in sections, wherein an isolating medium 105 is arranged within the external sheath, wherein the isolating medium 105 is designed to surround the first line arrangement 101-1 and the second line arrangement 101-2 and to keep said line arrangements at a distance from the external sheath 103 in order to reduce a pull-off force when pulling off the external sheath 103.

The first vehicle system and the second vehicle system can comprise sensors and/or actuators of the vehicle. By way of example, the first vehicle system is a wheel rotation-speed sensor which is mounted on a vehicle axle, and the second vehicle system is an active wheel suspension. The wheel rotation-speed sensor and the active wheel suspension can be connected to controllers of the vehicle via the first and, respectively, second line arrangement.

The first controller and the second controller can be part of a safety system of the vehicle such as an antilock brake system (ABS) or an electronic stability control system (ESP). The first controller and the second controller can receive signals, for example sensor signals or control signals, from or transmit said signals to the first vehicle system and, respectively, the second vehicle system via the first line arrangement 101-1 and, respectively, the second line arrangement 101-2. The first controller and the second controller can each comprise a processor or a microprocessor.

The external sheath 103 can sheath the line arrangements 101-1, 101-2 only in sections, so that isolation of the line arrangements 101-1, 101-2 for connection to different vehicle systems or controllers is made possible. During mounting of the line system 100, the external sheath 103 can initially surround the line arrangements 101-1, 101-2 over the entire length. Depending on the position of and distance between the vehicle systems and controllers, the external sheath can then be correspondingly shortened at both ends of the line system 100 in order to lay the individual line arrangements 101-1, 101-2 to the corresponding vehicle systems and controllers. Shortening of the external sheath 103 can be made considerably easier by the isolating medium 105 within the external sheath 103. For example, sections of the external sheath 103 of different length can be isolated from the rest of the sheath and pulled off from the line system 100 without a considerable application of force. In particular, a frictional resistance between the external sheath 103 and the line arrangements 101-1, 101-2 can be avoided on account of the isolating medium 105, and therefore the required pull-off force for pulling off the external sheath 103 can be considerably reduced.

The isolating medium 105 can comprise a nonwoven fabric and/or a woven fabric or can be formed from a nonwoven fabric and/or a woven fabric. The nonwoven fabric may be, for example, a polyethylene terephthalate nonwoven fabric. The nonwoven fabric and/or the woven fabric can be electrically insulating or have a particularly low electrical conductivity.

The nonwoven fabric and/or the woven fabric can fill cavities within the external sheath 103, in particular between the line arrangements 101-1, 101-2 and the external sheath 103. The nonwoven fabric and/or the woven fabric can have thicknesses of between 1 mm and 5 mm.

On account of their fiber structure, the nonwoven fabric and/or the woven fabric can greatly reduce a frictional resistance when pulling off the external sheath 103, so that only a low pull-off force has to be applied for pulling off the external sheath 103.

The isolating medium 105 can further comprise an isolating sheath which surrounds the first line arrangement 101-1 and the second line arrangement 101-2. The isolating medium 105, in particular the isolating sheath, can further have or form a first cutout 107-1 for receiving the first line arrangement 101-1 and a second cutout 107-2 for receiving the second line arrangement 101-2.

The external sheath 103 can be formed from a plastic, in particular from a thermoplastic elastomer. The thermoplastic elastomer can be a thermoplastic polyurethane which has, amongst other things, a high abrasion resistance, a high shear strength, a high elasticity and a high resistance to oil and grease. Therefore, the external sheath 103 can have a high mechanical flexibility for laying in the vehicle and at the same time a high mechanical stability and protect the sheathed line arrangements 101-1, 101-2 against damage.

The first electrical line arrangement 101-1 can comprise a first line 109-1 and a second line 109-2. Furthermore, the second electrical line arrangement 101-2 can comprise a first line 111-1 and a second line 111-2. The first lines 109-1, 111-1 can each comprise a signal cable or a signal line. For example, a sensor or actuator signal can be transmitted using the first line 109-1, 111-1. The second lines 109-2, 111-2 can comprise, for example, ground cables or ground lines.

The first line arrangement 101-1 can further comprise a first internal sheath 113 which surrounds the lines 109-1, 109-2 of the first line arrangement 101-1, and the second line arrangement 101-2 can comprise a second internal sheath which surrounds the lines 111-1, 111-2 of the second line arrangement 101-2.

In FIG. 1, only the first line arrangement 101-1 has the first internal sheath 113. In contrast, the lines 111-1, 111-2 of the second line arrangement 101-2 are not surrounded by a second internal sheath.

The first lines 109-1, 111-1 and the second lines 109-2, 111-2 can each have a copper core which is sheathed by an insulator sheath.

Figure 2:
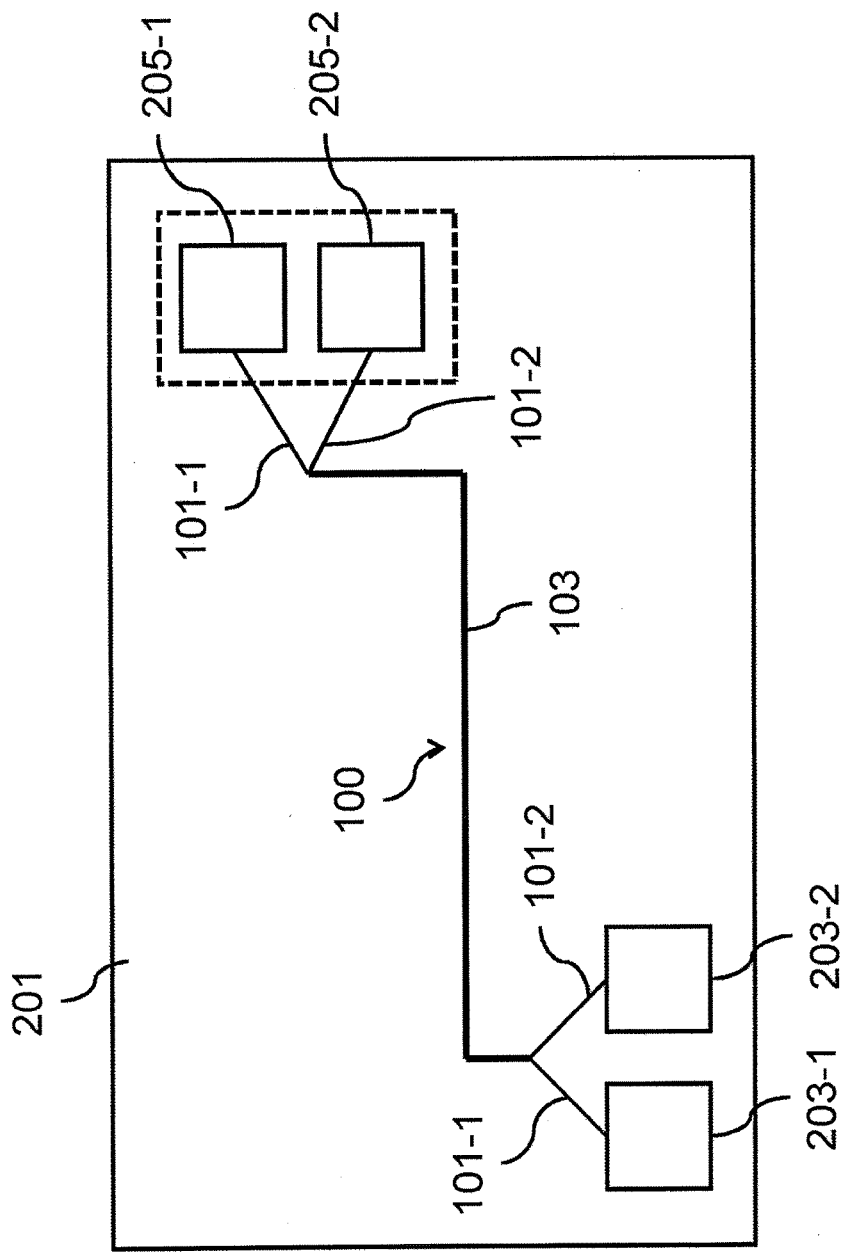
FIG. 2 shows a schematic illustration of an electrical line system which is laid in a vehicle.

FIG. 2 shows a schematic illustration of the electrical line system 100 which is laid in the vehicle 201 according to one embodiment.

The electrical line system 100 in FIG. 2 connects the first vehicle system 203-1 to a first controller 205-1 via the first line arrangement 101-1 and connects the second vehicle system 203-2 to the second controller 205-2 via the second line arrangement 101-2.

Here, the line arrangements 101-1, 101-2 are sheathed by the external sheath 103 to the greatest possible extent and are jointly laid or mounted in the vehicle 201. Only the ends of the line system 100 are not surrounded by the external sheath 103 in order to allow for connection of the line arrangements 101-1, 101-2 to the different vehicle systems 203-1, 203-2 and controllers 205-1, 205-2. On account of the joint arrangement of the line arrangements 101-1, 101-2 in one sheath to the greatest possible extent, installation and mounting time for the line arrangements 101-1, 101-2 can be considerably reduced. Furthermore, the installation space taken up by the line arrangements 101-1, 101-2 in the vehicle can be considerably reduced.

The first vehicle system 203-1 can comprise a wheel rotation-speed sensor. The first line arrangement 101-1 can be designed to transmit a sensor signal of the wheel rotation-speed sensor to the first controller 205-1. Furthermore, the second vehicle system 203-2 can comprise an active wheel suspension. The second line arrangement 101-2 can be designed to transmit a signal of the wheel suspension to the second controller 205-2.

The first controller 205-1 and the second controller 205-2 can be part of a safety system of the vehicle such as an antilock brake system (ABS) or an electronic stability control system (ESP). The first controller 205-1 and the second controller 205-2 can receive signals, for example sensor signals or control signals, from or transmit said signals to the first vehicle system 203-1 and, respectively, the second vehicle system 203-2 via the first line arrangement 101-1 and, respectively, the second line arrangement 101-2.

The first line arrangement 101-1 and the second line arrangement 101-2 can each have a plug-in connector at both ends for connection to the corresponding vehicle systems 203-1, 203-2 and controllers 205-1, 205-2.

For the purpose of mounting the line system 100, the external sheath 103 can have a number of mounting lugs. These mounting lugs can be mountable on a number of mounting clips. The mounting clips can be arranged on the vehicle 201, in particular on a body of the vehicle 201.

Furthermore, the external sheath 103 can have a number of clips, in particular cable ties, for mounting the line system 100. The clips can be used in order to fasten the electrical line system 100 to projections or mounting brackets on the body of the vehicle 201.

LIST OF REFERENCE SIGNS

100 Electrical line system
101-1 First line arrangement
101-2 Second line arrangement
103 External sheath
105 Isolating medium
107-1 First cutout
107-2 Second cutout
109-1 First electrical line
109-2 Second electrical line
111-1 First electrical line
111-2 Second electrical line
113 First internal sheath
201 Vehicle
203-1 First vehicle system
203-2 Second vehicle system
205-1 First controller
205-2 Second controller

The invention claimed is:

1. An electrical line system for a vehicle, comprising: a first line arrangement for electrically connecting a first vehicle system to a first controller;
    a second line arrangement for electrically connecting a second vehicle system to a second controller; an external sheath which surrounds the first line arrangement and the second line arrangement at least in sections; and an isolating medium arranged within the external sheath, wherein the isolating medium is designed to surround the first line arrangement and the second line arrangement and to keep said line arrangements at a distance from the external sheath in order to reduce a pull-off force when pulling off the external sheath, wherein the isolating medium has a first cutout for receiving the first line arrangement and a second cutout for receiving the second line arrangement.

2. The electrical line system as claimed in claim 1, wherein the isolating medium comprises a nonwoven fabric, wherein the nonwoven fabric is designed to fill cavities within the external sheath.

3. The electrical line system as claimed in claim 1, wherein the isolating medium comprises an isolating sheath which surrounds the first line arrangement and the second line arrangement.

4. The electrical line system as claimed in claim 1, wherein the external sheath is formed from a thermoplastic elastomer.

5. The electrical line system as claimed in claim 1, wherein the first line arrangement and the second line arrangement each comprise a first electrical line, and a second electrical line.

6. The electrical line system as claimed in claim 5, wherein the first line arrangement comprises a first internal sheath, wherein the first internal sheath surrounds the electrical lines of the first line arrangement, and/or wherein the second line arrangement comprises a second internal sheath, wherein the second internal sheath surrounds the electrical lines of the second line arrangement.

7. The electrical line system as claimed in claim 5, wherein the first lines and the second lines each have a copper core which is sheathed by an insulator sheath.

8. The electrical line system as claimed in claim 1, wherein the first line arrangement and the second line arrangement each have a plug-in connector at both ends in order to connect the line arrangements to the corresponding vehicle systems and controllers.

9. The electrical line system as claimed in claim 1, wherein the external sheath has a number of mounting lugs for mounting the electrical line system on the vehicle.

10. The electrical line system as claimed in claim 9, wherein the mounting lugs can be mounted on a number of mounting clips, wherein the mounting clips are arranged on the vehicle.

11. The electrical line system as claimed in claim 1, wherein the external sheath has a number of clips for mounting the electrical line system on the vehicle.

12. The electrical line system as claimed in claim 1, wherein the first vehicle system comprises a wheel rotation-speed sensor, wherein the first line arrangement is designed to transmit a sensor signal of the wheel rotation-speed sensor to the first controller, and/or wherein the second vehicle system comprises an active wheel suspension, wherein the second line arrangement is designed to transmit a signal of the wheel suspension to the second controller.

13. The electrical line system as claimed in claim 1, wherein the isolating medium comprises a nonwoven fabric composed of an electrically insulating material, wherein the nonwoven fabric is designed to fill cavities within the external sheath between the line arrangements and the external sheath.

14. The electrical line system as claimed in claim 2, wherein the isolating medium comprises an isolating sheath which surrounds the first line arrangement and the second line arrangement.

15. The electrical line system as claimed in claim 1, wherein the first line arrangement and the second line arrangement each comprise a signal cable and a ground cable.

16. The electrical line system as claimed in claim 6, wherein the first lines and the second lines each have a copper core which is sheathed by an insulator sheath.

* * * * *